United States Patent [19]
Lecours

[11] Patent Number: 5,709,440
[45] Date of Patent: Jan. 20, 1998

[54] TRACK NOISE SUPPRESSION

[75] Inventor: Gaetan Lecours, Valcourt, Canada

[73] Assignee: Bombardier Inc., Montreal, Canada

[21] Appl. No.: 381,761

[22] Filed: Feb. 1, 1995

[51] Int. Cl.$^6$ ................................................. B62D 55/096
[52] U.S. Cl. ........................... 305/178; 305/165; 305/169
[58] Field of Search ........................... 305/35 EB, 35 R, 305/38, 57, 178, 160, 165, 168, 169, 179, 185; 152/209 R, 209 B; 180/190

[56] References Cited

U.S. PATENT DOCUMENTS

| | | |
|---|---|---|
| 2,878,852 | 3/1959 | Lippmann et al. |
| 3,023,798 | 3/1962 | Moore et al. ........................ 152/209 R |
| 3,437,120 | 4/1969 | Verdier ................................ 152/209 R |
| 3,830,551 | 8/1974 | Masaoka et al. .................... 305/35 R |
| 3,926,238 | 12/1975 | Vorih ................................. 152/209 |
| 3,930,689 | 1/1976 | Maki ................................. 305/35 EB |
| 4,116,496 | 9/1978 | Scott .................................. 305/12 |
| 4,217,006 | 8/1980 | Dehnert ............................. 305/35 EB |
| 4,278,302 | 7/1981 | Westimayer et al. .............. 305/35 EB |
| 4,289,183 | 9/1981 | Abe et al. .......................... 152/209 B |
| 4,412,576 | 11/1983 | Nakajima .......................... 152/209 R |
| 4,416,317 | 11/1983 | Caretta ............................... 152/209 R |
| 4,474,223 | 10/1984 | Landers ............................ 152/209 R |
| 4,598,748 | 7/1986 | Campos et al. ................... 152/209 R |
| 4,721,141 | 1/1988 | Collette et al. ................... 152/209 A |
| 4,936,364 | 6/1990 | Kajiwara et al. ................. 152/209 A |
| 5,027,875 | 7/1991 | Kogure ............................. 152/209 R |
| 5,062,461 | 11/1991 | Noguchi ........................... 152/209 R |
| 5,078,190 | 1/1992 | Wissbrock et al. ............... 152/209 R |
| 5,125,444 | 6/1992 | Yoshida ........................... 152/209 R |
| 5,127,455 | 7/1992 | Remick ............................ 152/209 R |
| 5,178,698 | 1/1993 | Shibata ............................ 152/209 R |
| 5,209,793 | 5/1993 | Cusimano, II ..................... 152/209 |
| 5,240,054 | 8/1993 | Kogure ............................. 152/209 |
| 5,287,905 | 2/1994 | Caretta et al. .................... 152/209 R |

FOREIGN PATENT DOCUMENTS

| | | |
|---|---|---|
| 339232 | 2/1934 | Canada . |
| 2808867 | 10/1957 | Canada . |
| 1050869 | 3/1979 | Canada . |
| 2045760 | 1/1992 | Canada . |
| 2054102 | 9/1992 | Canada . |
| 2075600 | 2/1993 | Canada . |
| 4-283179 | 3/1991 | Japan . |
| 6-199253 | 12/1992 | Japan . |

*Primary Examiner*—David M. Mitchell
*Assistant Examiner*—Jonathan J. Yun
*Attorney, Agent, or Firm*—Dorsey & Whitney LLP

[57] ABSTRACT

The noise generated by a snowmobile track in operation can be reduced and attenuated by arranging for the track elements such as the drive lugs and ground-engaging lugs to have a degree of non-uniformity in their repeating pattern and thus to avoid the generation of peak noise levels at particular frequencies.

5 Claims, 3 Drawing Sheets

TRACK NOISE SUPPRESSION

BACKGROUND OF THE INVENTION a) Field of the Invention

This invention relates to a new or improved snowmobile track, and particularly to such a track which will be quieter in operation than those that have hitherto been employed.

b) Description of the Prior Art

In the operation of a snowmobile over a certain speed typically 90 km/h, the track can generate a loud noise which the driver of the vehicle may perceive as being unpleasant or annoying. Analysis of the problem indicates that the unpleasant noise is a pure tone, i.e. a high level of noise at a particular frequency.

SUMMARY OF THE INVENTION

Analysis of a track noise generated in one snowmobile identified the problematic frequency as being 400 Hz for a constant speed, the amplitude being only 2 dB less than the total overall noise of the vehicle with microphone oriented to the track and around 10 dB more than any other frequency.

It is desirable to reduce the overall noise level of snowmobiles, and also to eliminate peak noise levels at particular frequencies because such noises are a source of irritation and annoyance to the operator of the vehicle. To this end the present; invention provides a snowmobile track comprising: an endless flexible belt of reinforced rubber composition said belt having a major outer surface and an opposed coextensive inner surface, said inner surface being formed for engagement by a power transmission means to deliver power from the snowmobile engine to the track, and also being configured for engagement by suspension means; said outer surface being adapted to run in engagement with a ground surface and propel the snowmobile relative thereto, said outer surface having projecting formations thereon for tractive interaction with the ground surface; wherein at least some of said projecting formations are non-uniformly spaced in the longitudinal direction of the track so as to avoid the generation of excessive noise at characteristic frequencies of the track during operation of the snowmobile.

There are various ways to achieve noise reduction through non-uniform spacing of the projecting formations or ground engaging lugs of the track. Typically these lugs are arranged at regular spacings longitudinally of the track, and significant noise reduction can be achieved simply by removing a small number of these lugs in a pattern that is irregular considered in the longitudinal direction of the track.

An additional measure that can be taken to reduce track noise is to ensure that the spacing of the external ground engaging lugs is at a different pitch from the spacing of the internal drive lug. Snowmobile tracks typically have two longitudinally extending series of drive lugs spaced transversely of the track, and by offsetting the drive lugs of one set relative to those of the other, a noise reducing effect can be achieved.

BRIEF DESCRIPTION OF THE DRAWINGS

The invention will further be described, by way of example only, with reference to the accompanying drawings wherein:

FIG. 1 shows a snowmobile 10 supported at its forward end on a pair of steerable skis 12 and at its rearward end on a driving track 14. In known manner the driving track is configured as an endless belt which passes over a drive sprocket (not shown), an idler sprocket 13, and a suspension arrangement 15 that supports the vehicle on the lower ground engaging run of the track.

DESCRIPTION OF THE PREFERRED EMBODIMENTS

Figure 1:
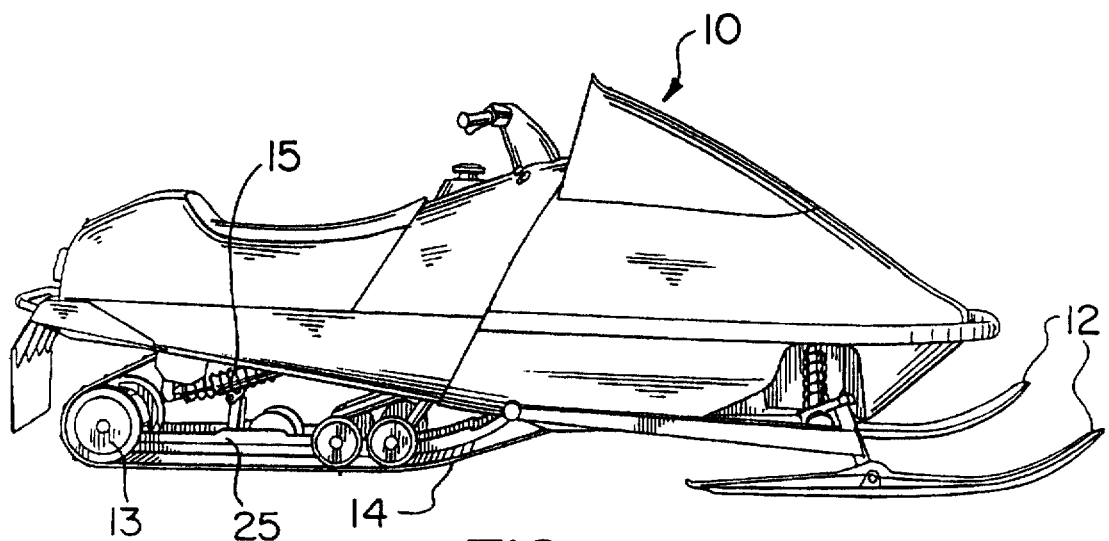
FIG. 1 is a side view of a snowmobile.
Figure 2:
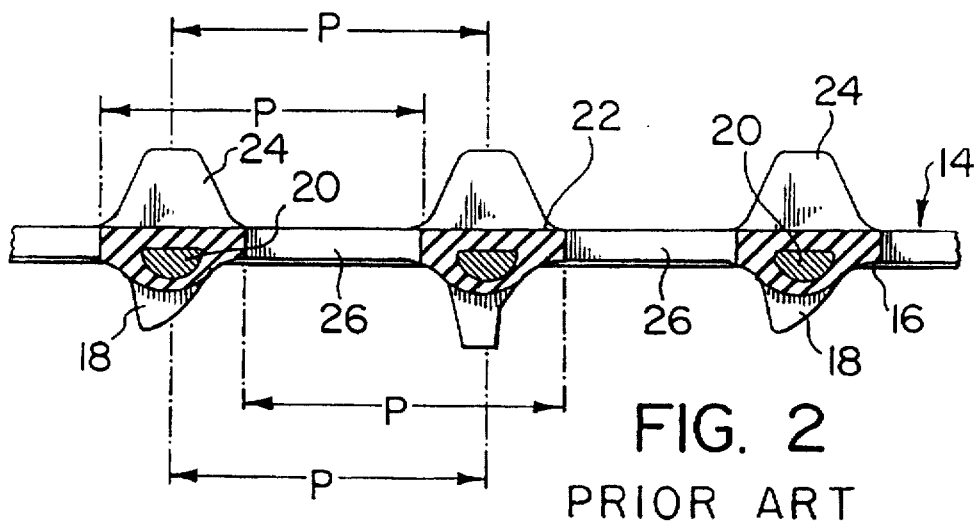
FIG. 2 is a longitudinal fragmentary sectional view off a snowmobile track of the prior art.

A typical track profile is shown in FIG. 2, the track 14 comprising a flexible belt of reinforced rubber composition formed on its outer surface 16 with a series of projecting and transversely extending traction lugs 18. The traction lugs may assume a variety of forms, and are regularly spaced apart in the longitudinal direction of the track at a pitch P. At the same uniform pitch spacing P there is a series of transverse reinforcing rods embedded within the track. On the internal track surface 22 are series of driving lugs 24 which are likewise spaced at the same uniform pitch P in the longitudinal direction of the track. As is well understood, these driving lugs 24 are provided, for engagement with the driving sprocket wheels (not shown) through which the engine power is transmitted to the track, these lugs being provided in a number of series that are in register, but are spaced transversely of the length of the track.

Where the suspension 15 employs slide rails 25 for engagement with the track, typically these are received between relatively closely spaced rows of lugs 24 which thus perform a guiding function between the slide rails 25 and the track 14. To reduce friction between the Slide rails 25 and the lugs 24 it is usual to provide metal guiding cleats (not shown) which are clinched around the track material in the region of the rods 20. Aligned with each slide rail 25, the track 14 is formed with a series of regularly spaced holes 26 through which snow or water may enter to provide a lubricating effect between the slide rails and the track. These holes also are at the same uniform pitch P in the longitudinal direction of the track.

The regularity of the pitch spacing of the various elements as discussed above has been recognized as contributing to the overall noise level of the snowmobile when in operation. Above a certain speed, typically about 90 km/H, the driver may perceive a loud noise coming from the snowmobile track. This noise is for the most part a pure tone and can be perceived quite unpleasant by the driver of the vehicle.

An analysis of the noise generated by operation of a specific vehicle, i.e. a Bombardier Skandic 503 (Trademark) snowmobile indicated that the frequency of the problematic noise was 400 Hz, and the amplitude at that frequency was only 2 dB less than the noise of the entire snowmobile, and around 10 dB higher than at any other frequency.

For a given track, the frequency F of the noise generated is given by the expression $$F = K \times S/P$$

where

K is a constant;

S is the speed of the vehicle in km/h; and

P is the pitch of the various track elements as discussed above.

For the track being analyzed the constant K has a value of 277.78 so that for a speed range of from 90 to 100 km/h the corresponding frequency range is 390 to 433 Hz.

Figure 3:
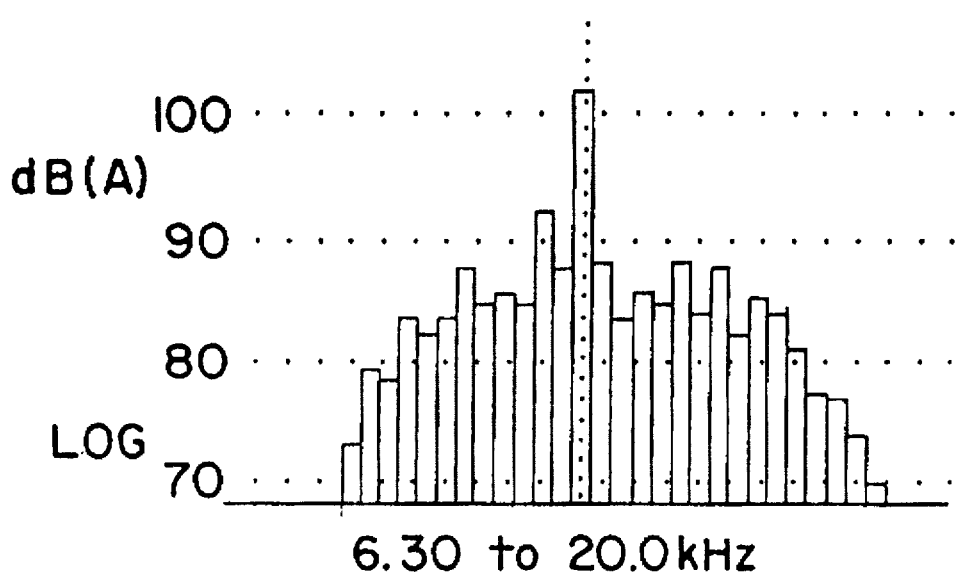
FIG. 3 is a graph showing the results of a test conducted on a track of the prior art.

FIG. 3 shows the spectral analysis of the amplitude (in decibels) of the noise produced by the snowmobile at different frequencies from 6.3 Hz to 20 kHz, from which it will be seen that at the frequency of 400 Hz the noise level is about 10 dB more than at any other frequency, and only 2 dB less than the total noise. The spectral analysis shown in FIG. 3 is for the snowmobile operating at a speed in the range 90 km/h, and the peak noise level at 400 Hz is within the frequency range of noise generated by the track.

By the simple expedient of modifying the track to selectively remove in an uneven pattern certain of the traction lugs 18 it was possible to effect a dramatic reduction in the pure tone noise generated by the track. The actual pattern in which the traction lugs 18 were removed was as follows:

In a repeating pattern of 12 lugs in the longitudinal direction of the track, lug numbers 2, 4, 5, 8, 10 and 11 were removed throughout the length of the track.

Figure 4:
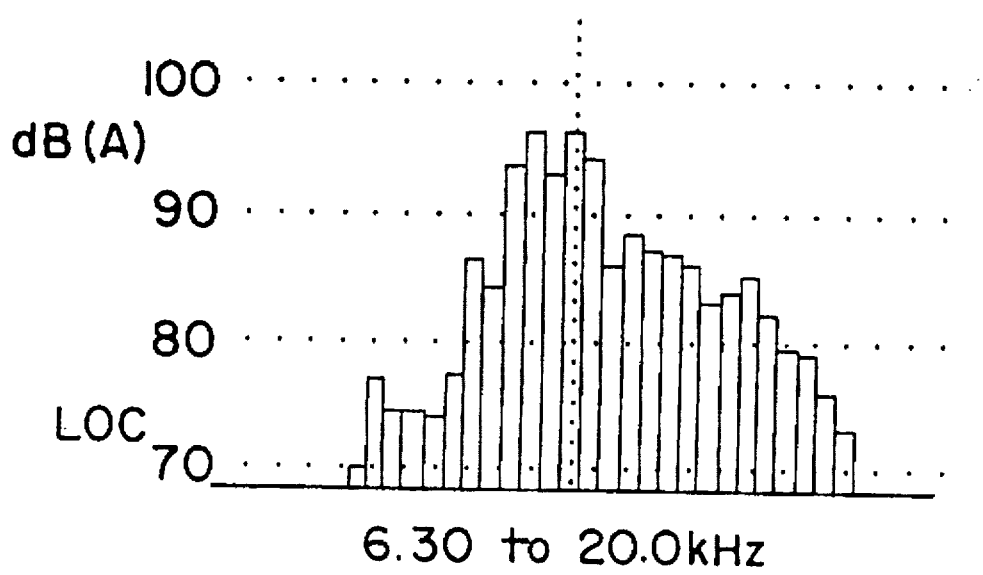
FIG. 4 is a graph showing the results of a test conducted on a snowmobile track modified in accordance with the invention.

The spectral noise analysis of the snowmobile with the track modified as described above is shown in FIG. 4 from which it will be seen that although the total noise generated is reduced only marginally (from 103.2 dB to 103.1 dB), the noise level at the 400 Hz frequency is reduced dramatically (by 5 dB) so that the annoying pure tone previously generated at that frequency was effectively eliminated.

Removal of the external traction lugs 18 if carried to excess can have a negative effect on the traction characteristics of the track, and for this reason, although it is effective, it not one of the preferred methods of achieving noise reduction, these being described below in relation to FIGS. 5 to 7. These figures illustrate various other possibilities for achieving attenuation of the noise generated at the frequency of concern. The track 28 shown in FIG. 5 incorporates a number of modifications to this end. This track is generally similar in construction to the track 14 previously described, being fabricated as a reinforced rubber structure having embedded therein a series of transverse reinforcing rods 30, with external traction lugs 32 on its outer surface and internal drive lugs on its inner surface. The drive lugs are arranged in transversely spaced rows 34 and 36, and although it is necessary to maintain the pitch P of the lugs in a given row at a constant value (because they have to engage with regularly spaced driving abutments on the sprocket wheel (not shown) the rows of lugs 34 and 36 are not transversely aligned, but rather are offset as indicated by an amount X which in turn attenuates the noise generated between the lugs 34, 36 and the drive sprocket and between the lugs 34, 36 and the suspension elements such as the slide rails 25.

Figure 5:
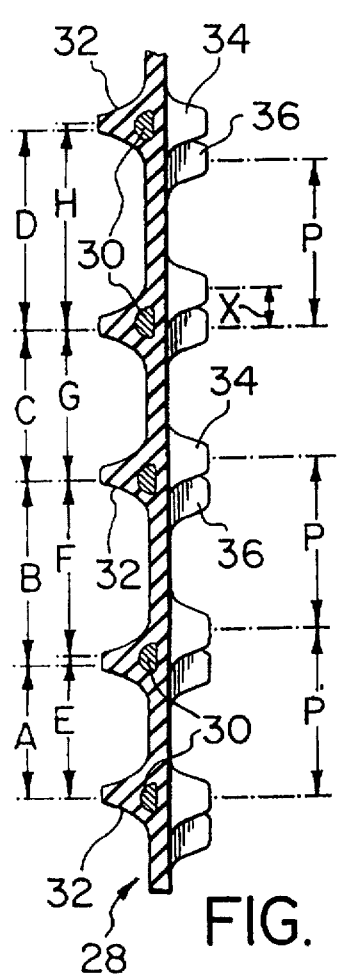
FIG. 5 is a view corresponding to FIG. 2 showing one embodiment of a snowmobile track in accordance with the invention and comprising a section taken on the line V—V in FIG. 6.

The longitudinal spacing between the embedded transverse reinforcing rods 30 is also varied, as illustrated in FIG. 5 by the dimensions E, F, G and H between the positions of successive rods 30. The length of the holes 38 between successive rods will likewise vary in accordance with the dimensions E, F, G and H.

Furthermore, the external traction lugs 32, while generally located in the vicinity of the rods 30 are also spaced non-uniformly in a longitudinal direction of the track, as indicated by the dimensions A, B, C and D in FIG. 5. It will be understood that the spacing pattern A, B, C, D is repeated throughout the length of the track.

Figure 6:
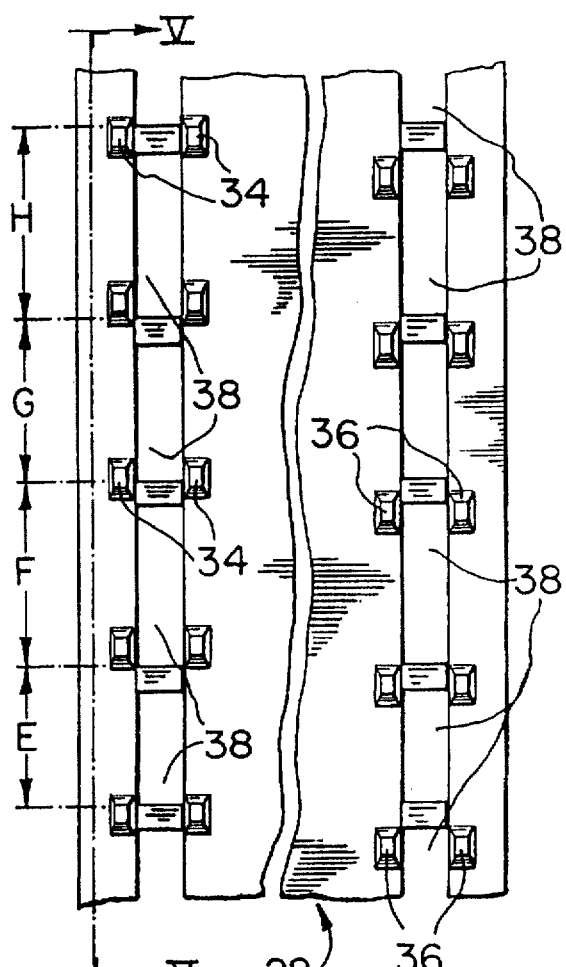
FIG. 6 is a view taken from the right hand side of the track of FIG. 5.

FIG. 6 shows the offset between the rows of drive lugs 34 and 36, and also illustrates that the holes 38 spaced along the track to register with the slide rails 25 are at non-uniform intervals as represented by the dimensions E, F, G and H.

Any of the above described expedients can be adopted alone, or they can be adopted in any combination to effect reduction in track generated noise.

Figure 7:
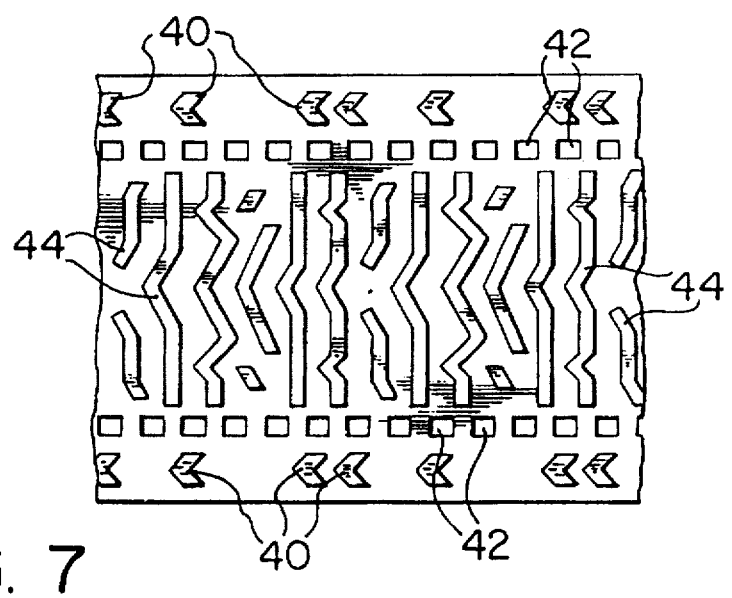
FIG. 7 is a view of the external track surface of a further embodiment.

A further expedient is shown in FIG. 7. Whereas typically the traction lugs 18 as described above are arranged in transverse rows, successive rows being identical, or having a repeat pattern of one or two rows, further noise reduction effects can be achieved by providing a more varied pattern of traction lugs as shown in FIG. 7. This arrangement shows the traction lugs aligned in essentially three rows, that is outer rows of lugs 40 between the holes 42 and the adjacent track edges, and central lugs 44 between the rows of holes 42.

From FIG. 7 it will be seen that there is irregularity in the repeat pattern of the outer or outboard lugs 40 in the length direction, and that the two rows of outer lugs are not transversely aligned. In the row of central lugs 44 there is a substantial variation from one to the next, and a repeat pattern of seven lugs in the longitudinal direction, this repeat pattern however not corresponding to the repeat pattern of the outer rows of lugs 40. Additionally, because of the angulated form of the lugs 40 and 44 and the offset between the transverse rows of lugs, the arrangement is such that at any point in the path of the belt as it circulates, there is an overlap between the lugs 40, 44 of one row and those of at least one adjacent row. This configuration effects a reduction in the noise that would otherwise be generated by the track, e.g. as successive rows of lugs come into contact with the ground surface.

I claim as my invention is:

1. A snowmobile track comprising:

an endless flexible belt of reinforced rubber composition said belt having a major outer surface and an opposed coextensive inner surface, said inner surface being formed for engagement by a power transmission means to deliver power from the snowmobile engine to the track, and also being configured for engagement by suspension means;

said outer surface being adapted to run in engagement with a ground surface and propel the snowmobile relative thereto, said outer surface having projecting formations thereon for tractive interaction with the ground surface;

wherein said projecting formations are positioned on said outer surface of said belt in transversely spaced rows that extend longitudinally of said belt, at least one of said rows comprising a series of longitudinally adjacent individual said projecting formations that are spaced in the longitudinal direction at separations that vary irregularly so as to reduce the generation of noise at characteristic frequencies of the track during operation of the snowmobile;

said individual said projecting formations in said at least one of said rows being generally at a uniform spacing except for certain pairs of adjacent said projecting formations at irregular longitudinal locations, which pairs are separated by a multiple of said uniform spacing;

at least two rows of drive lugs formed integrally with the inner surface of said belt, drive lugs of at least one said row having a pitch spacing in the longitudinal direction which is different from said uniform spacing of said projecting formations and the drive lugs of said two rows being offset longitudinally relative to each other, so as to reduce the generation of noise at characteristic frequencies of the track during operation of the snowmobile.

2. A snowmobile track as claimed in claim 1, said back including a series of transverse reinforcing rods embedded therein, said rods being spaced apart in the longitudinal direction of the track in a pattern wherein the spacing between adjacent reinforcing rods is irregular.

3. A snowmobile track as claimed in claim 1 wherein at least portions of said projecting formations of one transverse row overlap longitudinally with projecting formations of the adjacent transverse rows when viewed in the transverse direction, such that in operation said projecting formations of any transverse row begin to come into contact with the ground surface before the projecting formations of a preceding row have completely come into contact with the ground surface, so as to reduce the generation of noise at characteristic frequencies of the track during operation of the snowmobile.

4. A snowmobile track as claimed in claim 3 wherein each transverse row of projecting formations includes a central formation or formations and at least one outboard formation arranged between the central formation or formations and one longitudinal edge of the trank, the central formations having a repeat pattern in the longitudinal direction of the track that is different from the repeat pattern of the outboard formations.

5. A snowmobile track as claimed in claim 4 wherein the repeat pattern of the outboard formations is at least 5 of said outboard formations in the longitudinal direction, and the outboard formations along one edge of the track are not in register with the outboard formations along the opposite edge of the track.

* * * * *

UNITED STATES PATENT AND TRADEMARK OFFICE
CERTIFICATE OF CORRECTION

PATENT NO. : 5,709,440
DATED : January 20, 1998
INVENTOR(S) : Gaetan Lecours

It is certified that error appears in the above-identified patent and that said Letters Patent is hereby corrected as shown below:

Column 1, Line 66 reads "off" but should read --of--.
Column 2, Line 36 reads "provided," but should read --provided--.
Column 2, Line 37 reads "Which" but should read --which--.
Column 2, Line 44 reads "Slide" but should read --slide--.
Column 5, Line 10 reads "back" but should read --track--.
Column 6, Line 9 reads "trank" but should read --track--.

Signed and Sealed this

Twenty-first Day of April, 1998

Attest:

BRUCE LEHMAN

Attesting Officer

Commissioner of Patents and Trademarks